(12) United States Patent
McChesney et al.

(10) Patent No.: US 7,611,564 B2
(45) Date of Patent: Nov. 3, 2009

(54) RECOVERY OF N-PROPYL BROMIDE EMISSIONS

(75) Inventors: Joe McChesney, Bowling Green, KY (US); James R. Goodrich, Metamora, MI (US)

(73) Assignee: Parts Cleaning Technologies LLC, Southfield, MI (US)

( * ) Notice: Subject to any disclaimer, the term of this patent is extended or adjusted under 35 U.S.C. 154(b) by 368 days.

(21) Appl. No.: 11/615,538

(22) Filed: Dec. 22, 2006

(65) Prior Publication Data

US 2008/0148934 A1    Jun. 26, 2008

(51) Int. Cl.
*B01D 53/04*    (2006.01)
(52) U.S. Cl. ............... 95/8; 95/23; 95/142; 95/148; 423/240 S
(58) Field of Classification Search ............ 95/131, 95/142, 148, 8, 23; 423/240 R, 240 S
See application file for complete search history.

(56) References Cited

U.S. PATENT DOCUMENTS

| | | | | |
|---|---|---|---|---|
| 3,368,325 A * | 2/1968 | Sanders | .................... | 95/142 |
| 4,859,216 A * | 8/1989 | Fritsch | .................... | 95/142 |
| 4,902,310 A * | 2/1990 | Vara et al. | ................. | 95/259 |
| 5,547,491 A * | 8/1996 | Berwian et al. | ............ | 95/12 |
| 5,958,109 A * | 9/1999 | Fuderer | .................. | 95/99 |
| 6,444,015 B2 * | 9/2002 | Kato | ....................... | 95/143 |
| 6,458,185 B1 * | 10/2002 | Reiter et al. | ............... | 95/115 |
| 7,217,849 B2 * | 5/2007 | Meirom et al. | ............ | 570/248 |

* cited by examiner

*Primary Examiner*—Frank M Lawrence
(74) *Attorney, Agent, or Firm*—Harness, Dickey & Pierce, P.L.C.

(57) ABSTRACT

A process for recovery of n-propyl bromide solvent includes mixing a solvent laden vapor stream with an additive and reclaiming the solvent using a carbon adsorption system. A carbon adsorption system and an additive dispensing system form a system for the recovery of n-propyl bromide. These processes and systems use an additive that includes an acid scavenger and a carrier.

12 Claims, 1 Drawing Sheet

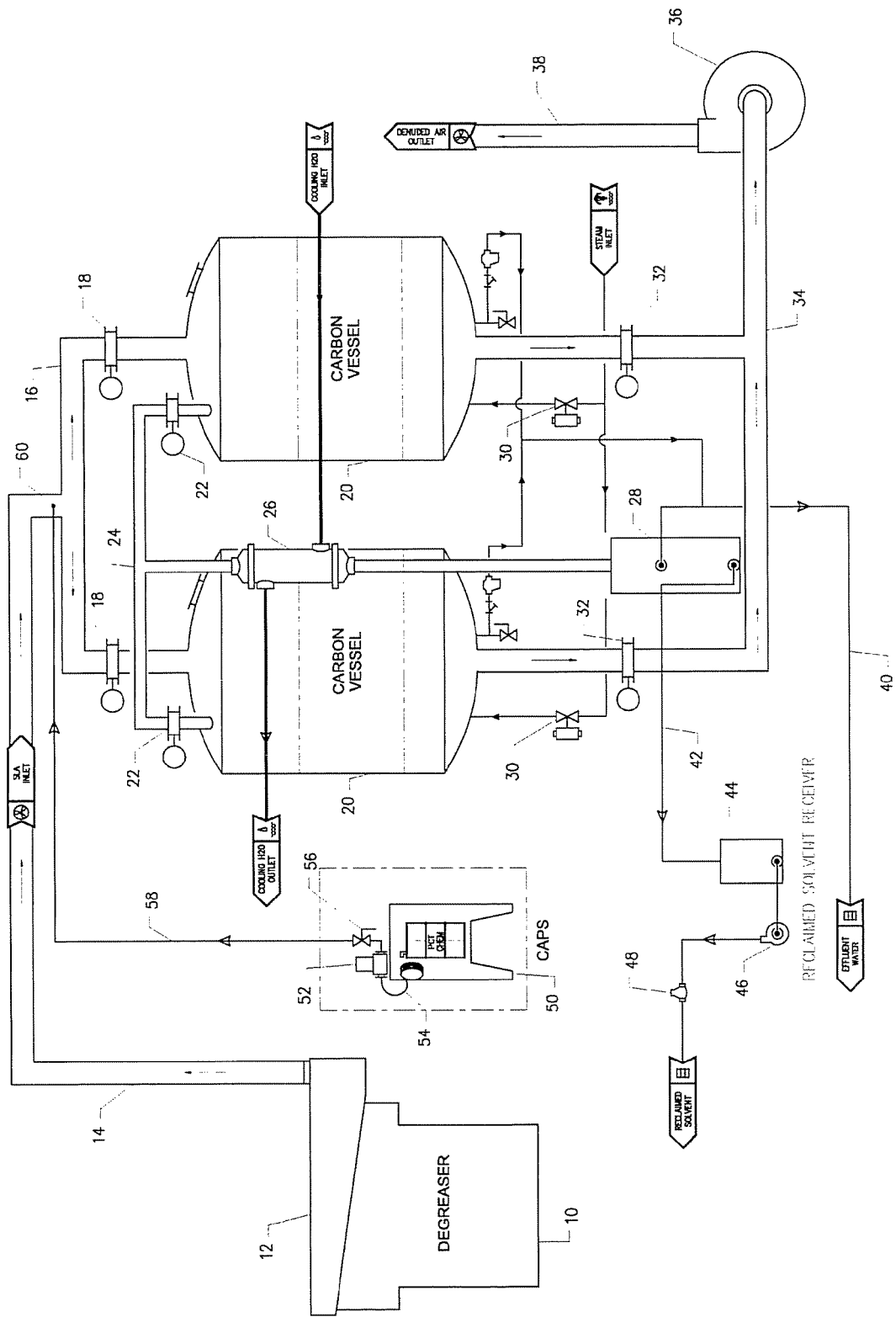

RECOVERY OF N-PROPYL BROMIDE EMISSIONS

BACKGROUND OF THE INVENTION

1. Technical Field

The present disclosure relates to fugitive emission recovery of n-propyl bromide (nPB) solvent.

2. Discussion

Many manufactured parts are cleaned in order to remove lubricants, cutting oils, drawing compounds, and miscellaneous contaminants present in various fabrication processes. For example, metal parts and circuit boards are commonly subjected to cleaning or degreasing processes using a volatile solvent. Volatile solvents commonly used for cleaning or degreasing include trichloroethylene, perchloroethylene, and methylene chloride, among others. Some of these solvents can have negative effects on the environment, by causing ozone depletion for example, and commercial use of volatile solvents is subject to increasingly stringent regulations, as mandated by the U.S. Environmental Protection Agency and the Occupational Safety and Health Administration. In fact, use of particular volatile solvents has been phased out completely in some cases.

Alternative volatile solvents suitable for use as cleaners and degreasers are desired. One such alternative solvent is n-propyl bromide (nPB), which is recognized as a viable replacement for chlorinated solvents in degreasing or cleaning applications. Use of nPB in a typical commercial degreasing operation would be facilitated both economically and environmentally given a way to effectively recover the nPB solvent present in fugitive emissions. Recovery would allow nPB to be reused in the degreaser thereby saving material costs and would reduce or even eliminate atmospheric emissions.

A need, therefore, exists for a process by which nPB can be recovered from a degreaser vapor stream. In addition, systems and compositions that permit recovery of nPB by reducing or preventing loss of nPB to the atmosphere would reduce or prevent undesirable environmental effects. Moreover, the ability to reuse the recovered nPB would be economically advantageous.

SUMMARY OF THE INVENTION

In one embodiment, the present teachings provide a process for recovering n-propyl bromide comprising mixing a vapor stream and an additive to form a mixed vapor stream, the vapor stream including n-propyl bromide and the additive including an acid scavenger and a carrier. The n-propyl bromide is then reclaimed from the mixed vapor stream using a carbon adsorption system. In some embodiments, the vapor stream including n-propyl bromide can be from a solvent degreasing operation.

Various embodiments include a process that further comprises measuring a velocity of the vapor stream and a concentration of n-propyl bromide in the vapor stream and determining an additive addition rate that produces from about 250 ppm to about 300 ppm of the acid scavenger in the mixed vapor stream as a function of the velocity of the vapor stream and the concentration of n-propyl bromide in the vapor stream. In other embodiments, the process further includes measuring at least one value of: a flow rate of the vapor stream; a concentration of n-propyl bromide in the vapor stream; an adsorption time period; a desorption time period; and an n-propyl bromide recovery rate. An adjusted additive addition rate is determined, which is based on the measured value, and the mixing and reclaiming steps can then be repeated, wherein the mixing step includes an amount of additive based on the adjusted additive addition rate.

In some embodiments, the reclaiming step includes adsorbing the mixed vapor stream with activated carbon in at least one carbon vessel. The activated carbon is subsequently desorbed using steam and condensing a desorbed mixture followed by separating the desorbed mixture into an organic phase and an aqueous phase. The organic phase containing the n-propyl bromide is then recovered.

Other embodiments provide a system for recovery of n-propyl bromide. A system can include a carbon adsorption system including an inlet and an additive dispensing system coupled to the inlet, the additive dispensing system including an additive, wherein the additive includes an acid scavenger and a carrier. Various embodiments include a carbon adsorption system having a carbon vessel coupled to the inlet downstream of where the additive dispensing system is coupled to the inlet, the carbon vessel containing activated carbon; a denuded discharge valve coupled to the carbon vessel; a blower coupled to the denuded discharge valve; a steam injection valve coupled to the carbon vessel; a reclaimed solvent outlet valve coupled to the carbon vessel; a heat exchanger coupled to the reclaimed solvent outlet valve, the heat exchanger further coupled to a coolant source; and a water separator coupled to the heat exchanger, the water separator including a waste water discharge and a reclaimed solvent discharge.

Additional embodiments provide a system for recovery of n-propyl bromide where the additive dispensing system includes a reservoir containing the additive; a pump fluidly connected to the additive in the reservoir; a metering device fluidly connected to the pump; and a mixing device fluidly connected to the metering device and coupled to the inlet of the carbon adsorption system. Operation of the pump can move additive from the reservoir to the pump, through the pump to the metering device, through the metering device to the mixing device, and into the inlet of the carbon adsorption system.

Some embodiments of the present disclosure provide an additive for recovery of n-propyl bromide in a carbon adsorption system. The additive includes an acid scavenger and a carrier, wherein the boiling point of the additive is from about 60° C. to about 80° C. and the pH of the additive is from about 7 to about 10. In other embodiments, the acid scavenger includes a primary, secondary, or tertiary amine having lower alkyl groups, wherein lower alkyl groups include linear and branched carbon chains having from 1 to about 6 carbon atoms. In further embodiments, the acid scavenger comprises triethylamine and/or diisopropylamine. In still further embodiments, the acid scavenger has a pH from about 10 to about 12. Various embodiments also include an additive where the carrier includes one or more of n-propyl alcohol, n-propyl bromide, and water.

The various processes, systems, and compositions of the present teachings can be used to recover nPB to reduce or prevent fugitive emissions. One facet of the present teachings includes the additive, where the additive enables nPB to be used with a carbon adsorption system. Absent the additive, recovery of nPB using a carbon adsorption system results in catastrophic failure of the carbon unit construction materials and/or degradation of the recovered solvent. Previous laboratory tests demonstrated that nPB solvent recovered without using the additive resulted in aggressive degradation of the metal construction of the carbon vessels in the carbon adsorption system during the steam desorbtion cycles. In particular, hydrobromic acid (HBr) formed during steam desorption caused acid catalyzed corrosion of the carbon adsorption system.

The processes, systems, and compositions of the present disclosure solve the problems related to recovery of nPB with carbon adsorption systems. The present teachings allow substitution of nPB solvent for a chlorinated solvent where nPB can be used with existing degreasing and carbon adsorption systems without harming the carbon adsorption system. A solvent user can therefore adopt nPB solvent in conjunction with the present processes, systems, and compositions in order to meet environmental compliance without excessive costs. For example, a typical reduction in gross solvent purchases due to reclamation can be about 50% and the system for recovering nPB can pay for itself in solvent savings. In addition, solvent recovery enables a user to comply with OSHA regulations while providing a safer work place environment for employees.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, disclosure of ranges includes disclosure of all values and further divided ranges within the entire range.

BRIEF DESCRIPTION OF THE DRAWING

The drawing described herein is for illustration purposes only and is not intended to limit the scope of the present disclosure in any way.

FIG. 1 is a schematic of one embodiment of system for recovery of n-propyl bromide constructed in accordance with the teachings of the present disclosure.

DETAILED DESCRIPTION OF THE PREFERRED EMBODIMENTS

Further areas of applicability and advantages will become apparent from the following description. It should be understood that the description and specific examples, while exemplifying various embodiments of the invention, are intended for purposes of illustration and are not intended to limit the scope of the invention.

The present disclosure includes processes, systems, and compositions that make possible the recovery and reclamation of fugitive emissions containing nPB solvent used in a typical degreasing operation without damage to the system or chemical degradation of the captured solvent. The solvent reclaimed according to the present teachings is suitable for reuse in the original solvent degreasing process.

Fugitive emissions can be captured using a carbon adsorption system. Carbon adsorption is an efficient and cost effective pollution control and solvent recovery process that can effectively reclaim solvent vapors that would normally be dissipated to the atmosphere. Carbon is an ideal material used in adsorption systems because of the unique surface tension properties it exhibits. Due to its non-polar surface, activated carbon can preferentially attract other non-polar materials such as organic solvents rather than polar materials like water. Carbon's granular multifacet geometry also possesses tremendous surface area (e.g., 1 lb. can have an effective surface area greater than 750,000 sq. ft.). This characteristic allows carbon to adsorb up to 30% of its own weight in solvent. Solvent recovery efficiency as high as 95% to 98% of the incoming solvent laden air stream can be achieved or exceeded in some cases.

A general process for solvent recovery consists of passing solvent laden air through an activated carbon bed to adsorb the solvent. Solvent laden air is directed from the exhaust source of the degreaser to the activated carbon bed by a blower/fan assembly. The activated carbon adsorbs and captures the solvent molecules allowing residual denuded air to be exhausted to the atmosphere through a ventilation duct. This process continues until the entire carbon bed is near saturation with solvent.

At the end of the time allowed for adsorption, the carbon adsorption system can automatically switch the incoming air flow from the first carbon bed to a second carbon bed. This allows incoming solvent laden air to flow through a fresh activated carbon bed while the first bed is desorbed of solvent or stripped. The first bed is desorbed by injecting with steam which passes through the carbon bed vaporizing the adsorbed solvent. Additionally, the physical characteristics of the steam condensate passing through the carbon assist in removing solvent residue. The mixture of steam condensate and solvent then passes through a water cooled heat exchanger which cools the solution. The condensate is collected in a water separator allowing for gravity separation to occur due to the difference in specific gravity of the liquids. The reclaimed solvent in the organic phase is now ready for reuse or disposal and the water discharge, or aqueous phase, is channeled for treatment or disposal.

An issue with using a carbon adsorption system to reclaim nPB involves the desorption of the activated carbon bed using steam. Steam desorption of nPB from activated carbon can result in a chemical reaction that destabilizes the nPB solvent and can result in formation of hydrobromic acid (HBr) inside the carbon vessel unit. The HBr acid compound can attack the carbon vessel construction materials, which typically can be Type 304 stainless steel, eventually resulting in material failure and severely limiting the equipment life span.

The present teachings avoid catastrophic failure of the carbon unit by mixing an additive with the nPB vapor stream prior to adsorbing the mixed vapor stream onto the activated carbon. The chemical additive mixes with the incoming solvent laden air stream and neutralizes any compounds harmful to the solvent recovery equipment which are formed during the desorption process due to hydrolytic breakdown of the nPB solvent. The formulation of the chemical additive is designed to neutralize any acids formed in the recovery process.

The additive includes an acid scavenger and a carrier. The acid scavenger acts to chemically neutralize acids, such as HBr, that are formed during the nPB reclamation process while the carrier serves to solubilize the acid scavenger and impart volatility to the additive. The additive is generally alkaline in order to neutralize any acidic compounds formed in the recovery of nPB. As such, the pH of the additive can be about or greater than 7, and in some embodiments the pH of the additive is from about 7 to about 10. In other embodiments the pH of the additive is about 8.5 to about 9.5 and in further embodiments the pH is about 9. The pH of the additive can be kept lower than about 10 when the additive is used in solvent reclamation systems having materials including brass or aluminum, for example, so that the alkaline additive does not chemically affect these metals.

The acid scavenger of the additive can be a chemical compound that is generally alkaline. The acid scavenger can also be relatively volatile to facilitate mixing of the additive and the vapor stream having nPB. In some embodiments, the acid scavenger can include an amine. Amines suitable for use as acid scavengers include one or more of primary, secondary, and tertiary amines having lower alkyl groups, where lower alkyl groups include linear and branched carbon chains having from 1 to about 6 carbon atoms. In some embodiments, the amines include linear and branched alkyl groups having 2 or 3 carbon atoms. In various embodiments the amine can have a pH from about 10 to about 12. Exemplary amines suitable as acid scavengers include triethylamine and diisopropylamine.

The carrier component of the additive can include one or more solvents in which the acid scavenger is soluble. Furthermore, the carrier can help impart the desired volatility to the additive so that the additive can be mixed with the vapor stream that includes nPB to form a mixed vapor stream for adsorption onto an activated carbon bed. In some embodiments, the additive can include one or more solvents with volatility similar to the nPB solvent that is being reclaimed. In various embodiments, the additive can have a boiling point from about 60° C. to about 80° C. Exemplary carriers include nPB, n-propyl alcohol, water, and mixtures thereof.

In some embodiments, the additive includes mixtures of the following compounds, where percentages correspond to weight percent:

| | |
|---|---|
| triethylamine | 8.0-12.0% |
| diisopropylamine | 0.1-0.2% |
| n-propyl alcohol | 11.0-15.0% |
| n-propyl bromide | 73.0-80.0% |
| water | 0.5-1.5% |

Embodiments of these additives can have a specific gravity of about 1.16; a density of about 9.6 lbs/gallon; and a boiling point from about 67° C. (153° F.) to about 74° C. (165° F.).

The present teachings also provide a system for recovery of nPB that includes a carbon adsorption system and an additive dispensing system. The additive dispensing system is coupled to an inlet of the carbon adsorption system and includes the additive having the acid scavenger and the carrier. The additive dispensing system is coupled to the carbon adsorption system to dispense the additive solution into the vapor stream. Various dispensing methods and devices can be used. For example, in some embodiments the additive can be wicked or dripped into the vapor stream or dispensed and mixed into the vapor stream using an impeller, and in other embodiments the additive can be injected under pressure and/or atomized into the vapor stream using a spray nozzle.

In some embodiments, the additive is dispensed in such a manner to insure precise amounts of additive are delivered per timed intervals to mix with the nPB solvent laden air stream entering the carbon unit. These embodiments can include injecting the additive under pressure through a nozzle to deliver precise amounts of atomized additive into the vapor stream containing nPB to order to form a mixed vapor stream containing nPB and additive.

The amount of additive dispensed can be configured to match design characteristics of the carbon adsorption system, where these characteristics include incoming solvent volume (ppm), air flow (cfm), and time periods for adsorption and desorption, and can also include adjustments based on characteristics of the particular additive formulation. The additive dispensing system can be configured to dispense an amount of additive into an nPB solvent stream based on the design of the degreaser and carbon adsorption system. The additive dispensing system, therefore, can be adapted to various system configurations and, accordingly, various carbon adsorption systems can be protected using the additive dispensing system. In some embodiments, existing carbon adsorption systems formerly used with other volatile solvents can be coupled with the additive dispensing system so that the carbon adsorption system can be used to recover nPB.

Adjustment of the additive dispensing system can be accomplished by taking various measurements and adjusting the amount of additive mixed into the vapor stream containing nPB. For example, each degreasing system has its own unique fugitive emission rate due to the size and type of degreaser, which is based on the feed rate of parts to be cleaned and efficiency of operation.

The following non-limiting example will be used in order to illustrate the calculations employed in adapting an additive dispensing system to work with a carbon adsorption system for recovery of nPB. Fugitive emission recovery from an adsorption/desorption cycle will be assumed to be 50 pounds of nPB during each cycle for the purpose of calculating additive dispensing rate. Also, the dispensing rate of the chemical additive can be set, such that the concentration of the acid scavenger component(s) of the additive (e.g., diisopropylamine and/or triethylamine) is about 250 ppm to about 300 ppm in the mixed vapor stream (i.e., the fugitive emissions stream) before entering the carbon adsorption system for nPB recovery. An average of 275 ppm acid scavenger will be used for purposes of calculation of the feed rate.

In the present example, the acid scavenger concentration in the additive is 9.57 percent by weight, or 0.92 pounds per gallon. At 275 ppm of chemical additive in the captured fugitive emissions over the typical three hour adsorption period, the weight of the alkaline components is corresponds to 0.01375 pounds. This is equivalent to 0.01496 gallons (57 mL) of chemical additive to be fed into the carbon adsorption system inlet and mixed with the vapor stream (containing nPB) over the three hour adsorption period. When the degreasing system has stabilized after several adsorption/desorption cycles, a corrected chemical additive dispensing rate can be calculated by dividing the stable fugitive emission recovery rate of nPB by 50 and multiplying by 0.32 mL per minute.

The additive dispensing system can include a chemically compatible pump mounted on a metal frame that serves as the pump support base as well as a drip pan. The pump can be selected to provide an adjustable low volume discharge at adjustable time intervals to dispense the amount of additive determined using the calculations as described. The lower section of the metal frame can incorporate a second drip pan that can hold a 5 gallon or smaller size reservoir of the additive.

The pump can be attached to the metal frame with one interconnecting chemical compatible hose from the pump suction port to a rigid dip tube to be inserted into the 5 gallon pail for chemical additive solution transfer from the pail by pump suction action. A second chemical compatible hose can be connected to the metering pump discharge port. A metering device on the pump discharge can be adjusted as necessary to dispense the requisite amount of additive. With one end of the hose attached to the pump, the other end can be connected to the mixing device that has been installed in the carbon adsorption system inlet duct. An electrical connection receptacle with an on/off switch can be mounted to the metal frame for the purpose of providing a controlled power source for the metering pump.

Another feature of the present teachings is the removal of excess, un-reacted chemical additive from the recovered nPB solvent during the desorption cycle. In the adsorption cycle of the fugitive nPB recovery, a three to four fold excess of the chemical additive can be fed to the system in order to give a driving force to the neutralization of any harmful compounds formed during the recovery process. If the excess, unused portion of the chemical additive were to be returned to the degreaser along with the recovered nPB, the concentration of the alkaline components would be too high in the degreasing system and could cause damage to various metals being degreased such as aluminium and/or brass. Consequently, the excess additive can be separated from the nPB following the desorption cycle by condensing the desorbed material in a water separator and allowing gravity to separate and settle the less dense aqueous layer containing the bulk of the additive from the more dense organic layer containing the nPB.

In the desorption cycle, the carbon bed is typically steam stripped. The alkaline components of the chemical additive along with carrier solvents, such as n-propyl alcohol, are infinitely soluble in water. Therefore, the additive components are removed from the recovered solvent by dissolving in the condensed steam by physical contact and removed from the system along with the steam condensate as the various solutions are phase separated in the carbon adsorption system's water separator. Thus, the recovered solvent that is returned to the degreaser will be near a neutral pH or only slightly alkaline, which will not damage aluminium or brass substrates in the degreaser.

FIG. 1 illustrates an embodiment of a system for recovery of nPB constructed in accordance with the present teachings. A typical open-top degreasing system is connected to a carbon adsorption system incorporating the additive dispensing system in order to reclaim nPB solvent without the formation of harmful by-products. The solvent user can effectively reclaim and reuse the captured solvent emissions that would normally be lost to ambient atmosphere.

Referring to FIG. 1, a typical open-top degreaser tank apparatus 10 is shown. The degreaser is equipped with a lip exhaust duct 12 designed to capture fugitive emissions that typically emanate from an operating degreasing system 10. This lip exhaust duct 12 is connected via a vapor transfer duct 14 to a typical carbon adsorption system (CAS).

The function of a carbon adsorption system is to remove/capture the solvent in the air stream that is being pulled into and through the carbon vessel(s) 20. The standard industrial method to capture this solvent is through adsorption of the solvent using activated carbon as the adsorbing medium. As the solvent laden air stream is transferred from the degreasing system 10 to the CAS via the interconnecting vapor transfer duct 14, it enters the master inlet plenum duct 16 for the CAS. Here the solvent laden air stream is directed to the proper carbon vessel 20 through the use of an air operated valve 18. The valve 18 position (either open or closed) is determined by the operational process cycle of the CAS and controlled by the CAS electrical system to match the position with the cycle stage.

As the solvent laden air stream enters the appropriate carbon vessel 20, the physical contact of this solvent/air mixture being pulled through the carbon by the blower 36 results in the solvent being adsorbed by the carbon (due to its nature and design) with the denuded air being discharged through the air operated valve for denuded air stream 32 to the master discharge plenum duct 34. The plenum duct 34 is connected to the blower 36 which discharges the denuded air stream to external atmosphere via the denuded air discharge duct 38.

The type and design of the application specific carbon contained in the vessels 20 allow for the adsorption of a given amount of solvent over a given time using a known air velocity at a predetermined static pressure. All of these parameters are determined by the engineering design of the carbon adsorption system when the CAS is applied to a known degreaser apparatus 10. The amount of carbon vessels 20 and the operating valve positions 18 are determined by the initial CAS design parameters as stated above.

The solvent laden air flow is directed to one or more carbon vessels 20 for a controlled period of time. When the carbon has adsorbed the solvent from the air stream to a point where the carbon is becoming saturated, the process cycle is then changed. At this point, another carbon vessel 20 that was off-line can be brought on-line to start adsorbing the incoming solvent stream; thus removing the solvent from the incoming air stream to prevent excessive fugitive emissions to the external atmosphere while the degreaser 10 is being used. The vapor stream containing nPB solvent is directed to the particular carbon vessel by opening the appropriate air operated valve 18.

The previous carbon vessel 20 that was near saturation stage can be desorbed to remove the solvent that was previously captured. This action is controlled by the CAS electrical system during selected cycle stages. Once a vessel 20 has been selected to be desorbed, the air operated valves 18, 32 will close to stop any air flow into or out of the carbon vessel 20. The air operated vapor valve 22 will be opened to create a pressure relief conduit. The steam injection valve 30 will be energized open to allow the injection of live steam into the saturated carbon vessel 20. The heat from the injected steam as well as the physical contact of the steam traveling through the carbon serves to remove the adsorbed solvent from the carbon. The amount of steam injected as well as the duration of this cycle is controlled by the CAS electrical and mechanical devices.

As the temperature of the carbon is elevated due to the contact with the live steam, some of the solvent is released from the carbon due to a vaporization effect. These solvent vapors exit the carbon vessel 20 through the open air valve 22 and enter the reclaimed solvent vapor header 24. The exiting solvent vapors are directed into the water cooled heat exchanger 26 for a sub-cooling effect and thus condensation from a vapor to a liquid. This process continues for the duration of the steam injection cycle. Eventually the carbon vessel 20 will be totally filled with steam vapors and steam condensate. When this occurs, the actual liquid steam condensate will assist in solvent removal from the carbon by a scrubbing effect. This liquid combination of solvent and steam condensate will also travel through the open vapor valve 22, through the reclaim header 24 and into the heat exchanger 26 for sub-cooling as well.

When the duration of the desorb cycle has expired, the steam injection valve 30 will close to stop any further steam input to the carbon vessel 20. The steam valve 30 is controlled by the CAS electrical devices. At this point in the process, the desorbed vessel 20 will enter an idle mode or be subjected to a timed forced air cool down mode in order to reduce the ambient temperature of the carbon and assist in drying the carbon to prepare the desorbed vessel 20 for the next adsorption cycle in the process.

As hot wet carbon will not readily adsorb solvent, the carbon must be dried and cooled before the next adsorption cycle. Ambient air or process air is drawn through the bed for a pre-set period of time, which dries and cools the carbon. At the end of this cycle, the unit shifts into a stand-by mode ready for the next adsorption cycle.

Once the vapors and the other liquids are sub-cooled by the heat exchanger 26, they are directed into the water separator 28 for solution phase separation created by gravity, retention time, internal temperature, and separator design. During the phase separation action, reclaimed solvent will be separated from the internal solution mixture of solvent and waste water. The effluent waste water consisting mostly of steam condensate will be discharged from the water separator 28 via the effluent waste water discharge line 40 for further treatment or proper disposal by user. The reclaimed solvent will also be discharged from the water separator 28 via the reclaimed solvent discharge line 42 into a reclaimed solvent receiver tank 44 for holding until treated with chemical additives or transferred back to the degreasing process for re-use.

The reclaimed solvent receiver tank 44 is provided with controls and a transfer pump 46 to transfer the reclaimed solvent back to the degreasing process on demand. The reclaimed solvent is pumped through a totalizer meter 48 which monitors and indicates how many gallons of reclaimed solvent have been recovered from the air stream and transferred back to the degreasing system 10. This meter 48 assists the end user in identifying and recording the amount of solvent reclaimed for environmental concerns.

A chemical additive pump station unit 50 is connected to the CAS unit to transfer a precise amount of additive to the incoming solvent laden air stream. The unit 50 consists of a metal frame and containment pan to hold the chemical additive container. A chemical transfer pump 52 sized per specific application is mounted on the frame assembly. This pump 52 is connected to the chemical additive container by a flexible line compatible with the chemistry. This line is connected to a rigid suction device 54 for insertion into the chemical container to insure chemical transfer from the container with very little contents remaining in the bottom of container once depletion occurs.

The chemical transfer pump 52 is equipped with a precise adjustable metering device 56 on the discharge side for process control. The pump 52 pulls the additive fluid from the container and discharges a precise amount of additive via the discharge line 58 to the mixing device 60 inserted into the master inlet plenum duct 16 of the CAS. The mixing of the additive with the solvent laden air stream alters the chemistry to eliminate the formation of harmful by-products that would normally be produced without the additive.

The description of the technology is merely exemplary in nature and, thus, variations that do not depart from the gist of the present invention are intended to be within the scope of the invention. Such variations are not to be regarded as a departure from the spirit and scope of the invention.

What is claimed is:

1. A process for recovering n-propyl bromide comprising:
mixing a vapor stream and an additive to form a mixed vapor stream, the vapor stream including n-propyl bromide and the additive including an acid scavenger and a carrier; and
reclaiming the n-propyl bromide from the mixed vapor stream using a carbon adsorption system.

2. A process of claim 1, wherein the mixing step produces from about 250 ppm to about 300 ppm of the acid scavenger in the mixed vapor stream.

3. A process of claim 1 further comprising:
measuring a velocity of the vapor stream and a concentration of n-propyl bromide in the vapor stream; and
determining an additive addition rate that produces from about 250 ppm to about 300 ppm of the acid scavenger in the mixed vapor stream as a function of the velocity of the vapor stream and the concentration of n-propyl bromide in the vapor stream.

4. A process of claim 1, further comprising:
measuring at least one value of: a flow rate of the vapor stream; a concentration of n-propyl bromide in the vapor stream; an adsorption time period; a desorption time period; and an n-propyl bromide recovery rate;
determining an adjusted additive addition rate based on the measured value; and
repeating the mixing and reclaiming steps, wherein the mixing step includes an amount of additive based on the adjusted additive addition rate.

5. A process of claim 1, wherein the reclaiming step comprises:
adsorbing the mixed vapor stream with activated carbon in at least one carbon vessel;
desorbing the activated carbon using steam and condensing a desorbed mixture;
separating the desorbed mixture into an organic phase and an aqueous phase; and
recovering the organic phase, wherein the organic phase contains the n-propyl bromide.

6. A process of claim 1, wherein the vapor stream is from a solvent degreasing operation.

7. A process for recovering n-propyl bromide comprising:
mixing n-propyl bromide and an acid scavenger; and
reclaiming the n-propyl bromide using a carbon adsorption system.

8. A process of claim 7, wherein the acid scavenger has a pH from about 10 to about 12.

9. A process of claim 7, wherein the acid scavenger comprises a primary, secondary, or tertiary amine having lower alkyl groups, wherein lower alkyl groups include linear and branched carbon chains having from 1 to about 6 carbon atoms.

10. A process of claim 7, wherein the acid scavenger comprises a member of a group consisting of triethylamine, diisopropylamine, and combinations thereof.

11. A process of claim 7, wherein the mixing step further comprises a carrier, the carrier comprising a member of a group consisting of n-propyl alcohol, n-propyl bromide, water, and combinations thereof.

12. A process of claim 7, wherein the reclaiming step comprises:
adsorbing the n-propyl bromide with activated carbon in at least one carbon vessel;
desorbing the activated carbon using steam and condensing a desorbed mixture;
separating the desorbed mixture into an organic phase and an aqueous phase; and
recovering the organic phase, wherein the organic phase contains the n-propyl bromide.

* * * * *